March 26, 1957 L. J. BOBB 2,786,896

MAGNETIC RECORDING AND REPRODUCING CIRCUITS

Original Filed Nov 24, 1947 2 Sheets-Sheet 1

Lloyd J. Bobb INVENTOR.

BY Synnestvedt & Lechner ATTORNEYS.

March 26, 1957 L. J. BOBB 2,786,896

MAGNETIC RECORDING AND REPRODUCING CIRCUITS

Original Filed Nov. 24, 1947 2 Sheets-Sheet 2

INVENTOR
Lloyd J. Bobb
Seymour & Feehner
ATTORNEYS

United States Patent Office 2,786,896 Patented Mar. 26, 1957

2,786,896

MAGNETIC RECORDING AND REPRODUCING CIRCUITS

Lloyd J. Bobb, Glenside, Pa., assignor to The International Electronics Company, Philadelphia, Pa., a corporation of Pennsylvania Continuation of application Serial No. 787,644, November 24, 1947, now Patent No. 2,641,655, dated June 9, 1953. This application March 4, 1953, Serial No. 340,273

10 Claims. (Cl. 179—100.2)

This invention relates to magnetic recording and reproducing systems, and is particularly concerned with electronic circuits for use in conjunction with magnetic recording and reproducing apparatus.

One of the objects of the present invention is to develop in a novel manner relatively large polarizing currents in a magnetic recording head.

Another object is to develop such currents without employing a power oscillator or amplifier employed exclusively for amplifying polarizing voltages.

A further object of the invention is to improve the signal-to-noise ratio in magnetic recording systems.

A further object of the invention is to employ a single high impedance head for both recording and reproducing without the use of impedance-matching transformers.

Yet another object of the invention is to provide control of the currents delivered to the loudspeaker voice coil during recording without affecting the currents delivered to the magnetic recording head.

A still further object of the invention is to prevent the building up of high voltage charges across the terminals of a magnetic recording head.

A still further object of the invention is to simplify the input and output inverting circuits used to alternatively condition the apparatus for recording and reproducing.

Still another aspect of the invention concerns means for compensating during reproduction for the frequency characteristics of magnetic recording media and magnetic recording heads.

Figure 1:
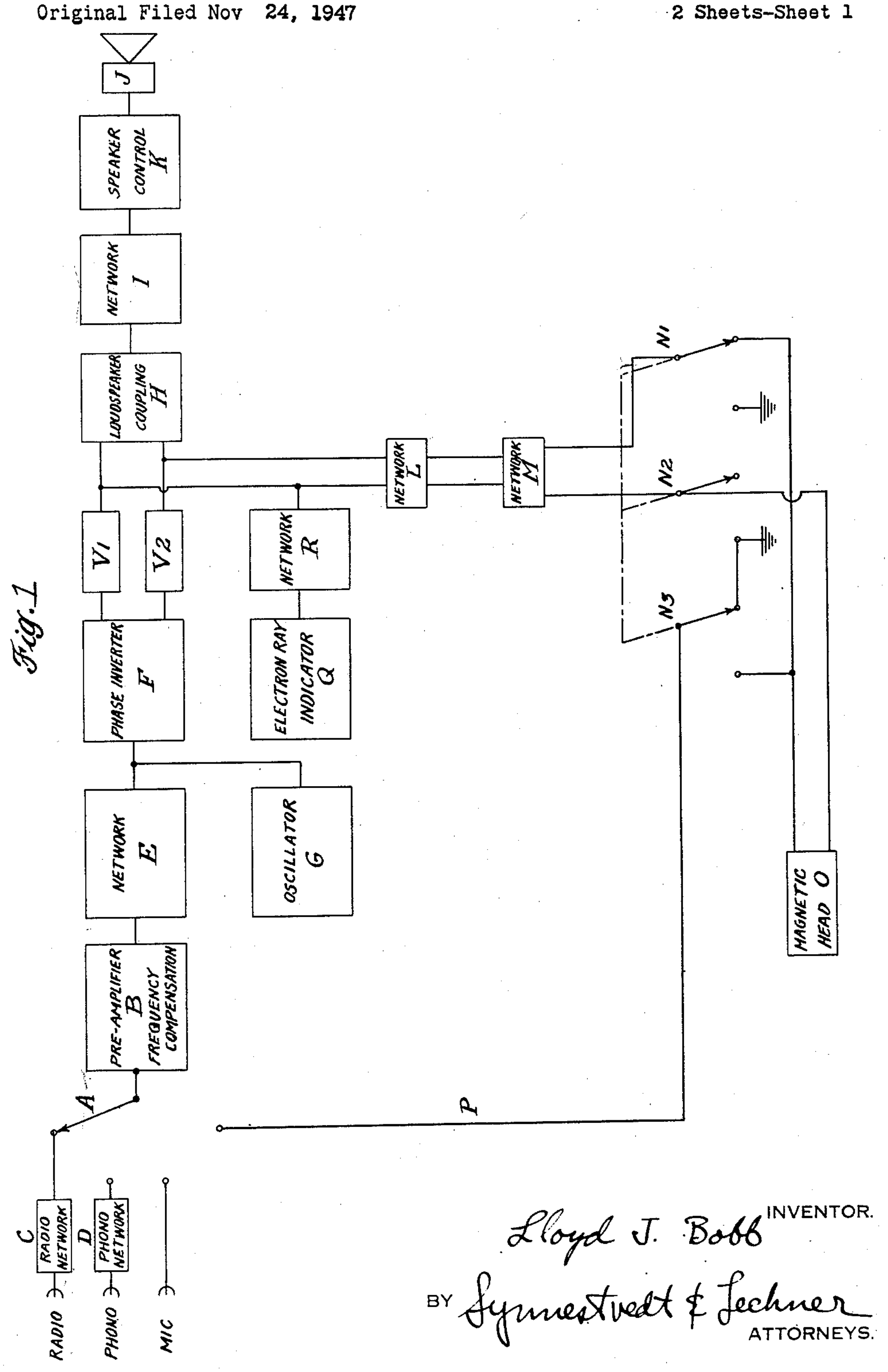
Figure 2:
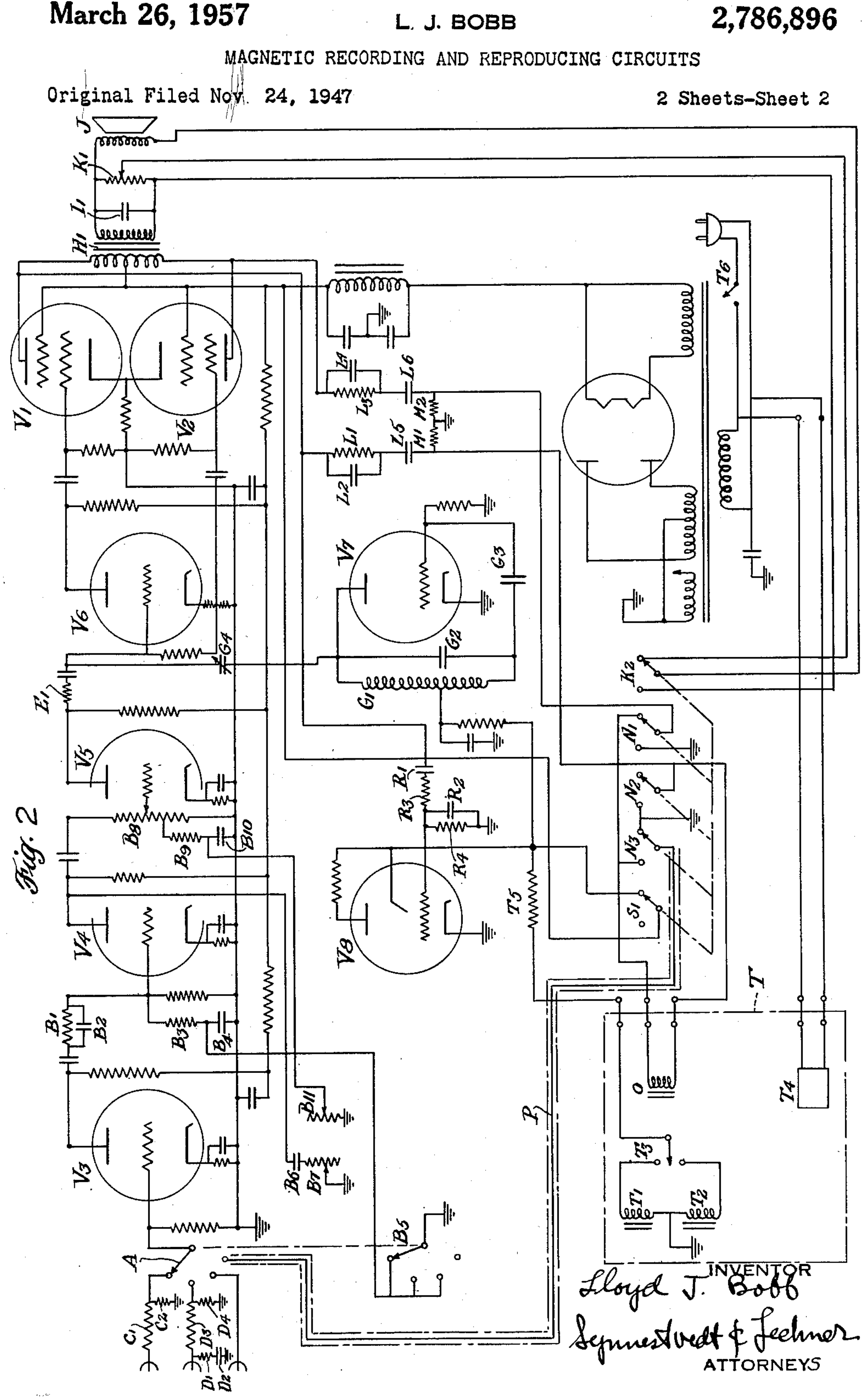

How the foregoing and other objects are attained will be more clearly understood upon reference to the drawings and to the description appended hereinbelow, in which:

Figure 1 is a block diagram of magnetic recording and reproducing apparatus arranged in accordance with the invention; and Figure 2 is a schematic circuit diagram of a magnetic recording and reproducing system incorporating the several aspects of the invention.

The magnetic recording and reproducing circuits disclosed herein are generally applicable to magnetic recording systems, for example, to magnetic record translating mechanism of the type disclosed in copending application Serial No. 715,518, filed December 11, 1946, now Patent No. 2,625,611, and assigned to the assignee of the present invention, entitled Magnetic Recording and Reproducing Apparatus; and copending application Serial No. 11,994, filed February 28, 1948, now Patent No. 2,686,845, assigned to the assignee of the present invention and entitled Equipment for Use With Elongated Magnetic Record.

According to a known method of magnetic recording, voltages representing the signal to be recorded are applied to a magnetic recording head simultaneously with a voltage of frequency considerably higher than the highest signal component. In some of the prior art systems of this type, the polarizing voltage was applied to a separate winding on the magnetic head, while in others the polarizing voltage was applied directly to the winding carrying the signal voltages. In either case, the voltage necessary to develop the required polarizing current was generated in an oscillator or similar voltage generator having a voltage output high enough to develop the necessary polarizing current, and, hence, the necessary polarizing field in the magnetic head.

According to the present invention, the polarizing voltage is generated by a low level oscillator, is injected into an audio frequency amplifier at a point prior to the final stage thereof, and is amplified in the final stage simultaneously with the signal voltages. The complex wave representing both the signal and polarizing voltages is then applied to a single winding on the magnetic head. It should be understood that by a "complex wave" I mean the wave resulting from the superimposition of a wave of one frequency on a wave of another frequency, rather than the wave resulting from the modulation of a carrier by a signal.

The invention, therefore, concerns the means by which the polarizing voltage and signal voltages are mixed in the amplifier, the means by which the complex wave representing the signal and polarizing voltages is applied to the magnetic head in a manner to produce the desired fluctuating magnetic field, and the manner in which the amplifier and associated equipment are modified to accommodate this method of developing the required recording field.

Other aspects of the invention concern certain features of the invention which, in cooperation with the method of combining the polarizing and signal voltages above referred to, produce especially advantageous results. Among these collateral features may be mentioned the means which, with my novel polarizing technique, make possible the reproduction and recording of a wide band of audio frequencies without distortion, the simplification of the means by which the apparatus is adjusted from one to another of the modes of operation described below, and the manner in which economies in production are effected.

The combination of my novel polarizing arrangement with these other features and advantages may best be understood upon examination and analysis of a complete circuit preliminary to discussing the individual features, and, accordingly, in the description below the various components are discussed in logical order, without reference to the novelty of individual portions.

As is more fully pointed out in the first-mentioned copending application, the apparatus of that application and the circuit of the present application are adapted for use in association with a radio frequency tuner, a mechanical phonograph, and an external microphone, the circuit being arranged to provide for the production of magnetic recordings from any of the three signal sources and to provide for the reproduction of signals from any of these sources as well as from magnetic recordings.

Turning now to the block diagram disclosed in Figure 1, it will be seen that the apparatus includes a jack for each of the three external signal sources. A selector switch A is provided to alternatively connect one of the three external signal sources or the magnetic head to the pre-amplifier and frequency compensation section of the circuit B. Interposed between the radio jack and selector switch A is a network C comprising a voltage divider for reducing the radio tuner output to a voltage comparable to the output of the magnetic recording head. A second network D includes a voltage divider for reducing the voltage output of a phonograph pick-up to a value comparable to that of the magnetic recording head, and a filter network adapted to compensate for the frequency characteristics of commercial phonograph records to deliver to the pre-amplifier B a voltage which is substantially independent of frequency.

The pre-amplifier B comprises one or more discharge tubes arranged to provide sufficient amplification to raise the output voltage from the magnetic head to an appropriate level, and, in addition, may include circuit elements for controlling the frequency response characteristics of the system.

For example, the pre-amplifier section may include a network operative at all times for improving the over-all response characteristics of the amplifier, and a second network operative only during reproducing and adapted to compensate for the characteristics of the magnetic recording medium being used and the magnetic head. In addition, the amplifier section may include manually adjustable means for controlling the frequency response of the amplifier, and manual means for controlling the amplification of a signal.

The ouput of the pre-amplifier and frequency compensation section passes through a network E, whose function will be explained below, and is delivered to a phase inverter F. An oscillator G arranged to generate an alternating voltage of a frequency substantially above twice the highest frequency to be recorded (of the order of 25 kc.) is connected to deliver its output to the phase inverter F simultaneously with the signal voltage from network E. The network E may take the form of any circuit element capable of passing the audio frequencies and blocking voltages of the polarizing frequency.

The out-of-phase voltages developed by the phase inverter are fed to the grids of a pair of power amplifier vacuum tubes V–1 and V–2, whose anodes are connected to an output coupling device H, for example, an output transformer. The output coupling device H is in turn connected to a network I for attenuating high order harmonics of the polarizing frequency. The output voltage is then delivered to a loudspeaker J through an attenuator K, which provides for control of the loudspeaker volume without shifting the over-all amplification of the amplifier.

Returning now to the power amplifier vacuum tubes V–1 and V–2, the voltage developed between the amplifier vacuum tube anodes is also delivered to a network L, which has a rising transmission characteristic with frequency. The network is proportioned to pass the polarizing current frequencies substantially without attenuation, but offers considerable impedance to the audio frequency currents. A bleeder network M is shunted across the output at this point and serves to bleed off high voltage charges which may build up across the output. This network may take the form of a resistor connected from each side of the circuit to ground.

I have provided a three-section double-throw switch N for shifting the magnetic head O from the input to the output of the amplifier when shifting from reproduction to recording. According to the invention, one side of the output is permanently connected to the magnetic head and also to the moving contact of switch section N–2. The other side of the output circuit is adapted to be connected to the second side of the magnetic head by switch section N–1. Switch section N–3 is adapted to connect selector switch A to the second side of the magnetic head. As will be seen, when the apparatus is adjusted for recording, the conductor P is grounded; and when the apparatus is adjusted for reproduction, the conductors leading from the network M to switch N are both grounded.

I have also provided an audio frequency amplitude level indicator for use during recording. The control voltage for the indicator is taken from one of the power amplifier tube anodes through a network R, which is adapted to block voltages of the polarizing frequency which would otherwise overload the indicator Q.

Turning now to the schematic diagram illustrated in Figure 2, it should first be pointed out that for the sake of clarity I have employed as reference characters in Figure 2 the letters applied to the various sections of the block diagram of Figure 2, each letter being followed by a subscript to differentiate the individual circuit elements of each section.

The circuit of Figure 2 is included as a specific illustration of the various aspects of the invention. Accordingly, the invention is not to be limited by the embodiment so illustrated, as will be well understood by those skilled in the art.

Considering first the radio tuner network, it will be seen that I have provided a voltage divider consisting of a pair of resistors C–1 and C–2, whose values are selected so that the ratio of C–1+C–2 to C–2 is in the ratio of the desired attenuation. For example, C–1 may be 500,000 ohms and C–2 10,000 ohms. Phonograph network D includes a compensation network comprising resistor D–1 and capacitor D–2, the values of which are selected to compensate for the constant amplitude-constant velocity changeover characteristics of commercial recordings. In addition, network D includes a voltage divider comprising resistors D–3 and D–4, which may have values respectively of 500,000 ohms and 100,000 ohms. The output terminals of networks C and D, together with other signal sources, are adapted to be selectively connected to the amplifier by means of selector switch A.

Turning now to the pre-amplifier-frequency-compensation section of the circuit, it should be understood that the values of many of the circuit elements, for example, the cathode dropping resistors and plate load resistors, are in accordance with standard practice.

The pre-amplifier section comprises three vacuum tubes—V–3, V–4 and V–5—arranged in a resistance-coupled cascade circuit. The signal from selector switch A is applied directly to the grid of V–3, whose output voltage is applied to the grid of V–4 through a compensation network comprising a resistance B–1 and a capacitor B–2. These elements are selected to have a combined transmission characteristic which rises slightly in the upper audio frequency range to compensate for the over-all falling off in that range which is due to shunt capacity and other effects distributed throughout the circuits. An appropriate value for B–1 is 220,000 ohms, and for B–2, 250 mmfd. This network is effective during both recording and reproduction.

The coupling between V–3 and V–4 also includes a low frequency compensation circuit comprising a resistor B–3 and a capacitor B–4, whose combined values are selected to have decreasing impedance with increasing frequency in the lower audio frequency range. The transmission characteristic is selected to compensate for the fact that the voltage induced in a magnetic head on reproduction is directly proportional to the rate of change of the magnetic flux and, hence, to the frequency. Capacitor B–4 is adapted to be short circuited by switch B–5, which is ganged with switch A in a manner to be closed whenever the apparatus is adjusted for recording. It will be seen, therefore, that this compensation circuit is effective only when magnetic recordings are being reproduced.

The output of V–4 is coupled to V–5 through circuit elements including a manual treble control comprising a capacitor B–6 and a variable resistance B–7 shunted across the output of V–4. The grid circuit of V–5 includes a volume control potentiometer B–8, and a manually controllable bass compensation network comprising resistance B–9 and capacitor B–10, and variable resistance B–11, which elements cooperate to provide for variation of the low frequency response of the amplifier.

As was pointed out in connection with the block diagram of Figure 1, the output of the preamplifier section is fed to the phase inverter through a filter network designed to block the polarizing voltage from the plate V–5. In the embodiment of the invention disclosed in Figure 2, this network takes the form of a resistor E–1, which may advantageously be of about 220,000 ohms.

The phase inverter section comprises a triode V–6 in a circuit arranged to supply out-of-phase voltages to the grids of push-pull output tubes V–1 and V–2.

Oscillator G comprises a triode V–7, a tank coil G–1, a tank capacitor G–2, and a capacitor G–3, the values of G–1 and G–2 being selected to resonate at the polarizing frequency. The output of oscillator G is fed to the grid of V–6 through a variable coupling capacitor G–4, which may be of about 10–50 mmfd. max.

The output stage comprises a pair of beam power tubes V–1 and V–2, whose plates are connected to the primary of an output transformer H–1.

It is desirable to prevent high order harmonics of the polarizing frequency voltage from reaching the leads to loudspeaker J, and to that end, I have included in the circuit of Figure 2 a capacitor I–1, which presents a relatively low impedance to such frequencies, but which has little or no effect on the audio frequencies. This capacitor may be of about 0.1 mfd. While it may appear that this capacitor is large enough to shunt out the audio frequencies, it should be borne in mind that the voice coil circuit has a very low impedance, compared to the impedance of capacitor I–1 at the audio frequencies.

The speaker circuit also includes a volume control potentiometer K–1, which may be of about 25 ohms resistance, and a switch K–2, associated with the recording-reproducing switch assembly described hereinbelow, to provide for manual control of the speaker volume during recording and to by-pass the manual control during reproduction.

Returning now to the power amplifier stage, it will be seen that the anodes of V–1 and V–2 are connected respectively to a first resistor-capacitor combination L–1—L–2, and a second resistor-capacitor combination L–3—L–4. Each of these combinations comprises values of resistance and capacity adapted to substantially attenuate currents of the audio frequency range but to pass substantially without attenuation currents of the polarizing frequency. The combination, of course, introduces less impedance at the higher audio frequencies than at the lower; but this is desirable for reasons which will appear. An appropriate value for L–1 and L–3 is from about two to fifteen times the impedance of the head. L–2 and L–4 should be selected to have a reactance equal to the resistance of L–1 and L–3 at a point in the upper audio frequency range. In the circuit of Figure 2, the resistors L–1 and L–3 may be about 100,000 ohms, and L–2 and L–4 about .001 mfd. when using a high impedance head. I have also included a pair of blocking capacitors L–5—L–6 to isolate the magnetic head from the direct current plate potential applied to the anodes of V–1 and V–2. These capacitors may be about .1 mfd.

In addition, I have provided a pair of resistors M–1, M–2 to bleed off static charges which may build up across the magnetic head terminals. In the embodiment represented by Figure 2, M–1 and M–2 are about one megohm each.

The conductors leading from the filter combinations above mentioned are connected to the moving contacts of switch sections N–1 and N–2 and, in addition, the moving contact of N–2 is also connected to one side of magnetic head O. The other side of magnetic head O is connected to the right-hand fixed contact of switch section N–1, and also to the left-hand contact of switch section N–3. The moving contact of section N–3 is connected to selector switch A by a conductor P. It will be seen, therefore, that when the switch N is in the right-hand position, the two output conductors are connected to the two sides of magnetic head O and that the conductor P is grounded by switch section N–3. When switch N is adjusted to the left-hand position, both of the output conductors are grounded and the ungrounded side of magnetic head O is connected to selector switch A by conductor P.

I have also included an amplitude level indicating device for use during recording, comprising an electron ray tube V–8 which is adapted to receive a control voltage from one of the power amplifier tube anodes. The grid circuit of V–8 includes a filter for preventing the application of voltages of the polarizing frequency to the electron ray tube and a voltage divider for reducing the audio voltage. The filter comprises capacitors R–1 and R–2, while resistors R–3 and R–4 constitute the voltage divider. The values of R–1 and R–2 are selected to effectively prevent the application of polarizing frequency voltages to V–8, but to permit the passage of audio frequency voltages.

Heater current and filtered direct current plate voltages are delivered to the amplifier and associated equipment by a conventional transformer-rectifier-filter system whose internal arrangement plays no part in the present invention. However, it should be pointed out that I have included an arrangement for supplying plate potential to oscillator triode V–7 and electron ray tube V–8, which arrangement is coordinated with the recording-reproducing switch to energize V–7 and V–8 only when the apparatus is adjusted for recording. As may be seen, plate voltage to V–7 and V–8 is delivered through switch section S–1 only when the recording-reproducing switch is in the right-hand or recording position.

I have also disclosed in Figure 2 a schematic representation of certain mechanical elements of a magnetic recording and reproducing system which do not constitute a part of the present invention but which are necessary to a complete understanding of the invention. These elements are enclosed by a dotted box T and include, in addition to the magnetic head O, to which reference has already been made, two erasing heads T–1 and T–2, a switch T–3, and a magnetic record translating motor T–4. As is pointed out in the copending applications to which reference has already been made, the magnetic record translating mechanism may advantageously be arranged to provide for recording in two directions on a magnetic record. It is therefore desirable to provide two erasing heads disposed on either side of the magnetic recording-reproducing head, and to energize whichever erasing head scans the record in advance of the magnetic recording head during the particular cycle of operation. In the circuit illustrated in Figure 2, the direct current for energizing the erasing heads T–1 and T–2 is derived from the switch section S–1, and is therefore only applied when the apparatus is adjusted for recording. The current is limited by a resistor T–5, and is applied to one or the other of erasing heads T–1 and T–2 by a switch T–3 which is controlled by the condition of the magnetic record translating equipment. Finally, the magnetic record translating motor is energized simultaneously with the power supply of the amplifier of the present invention, the current from the supply mains to both the motor and the amplifier power supply being controlled by a switch T–6.

Certain of the principal advantages of the invention will now be pointed out. Attention is first directed to the advantages arising out of the voltage divider and frequency compensation networks included between the external signal sources and selector switch A. While it is theoretically less efficient to "divide down" the voltage output of the external sources than to apply the full voltages to later stages of the amplifier, this theoretical disadvantage is more than outweighed by the great practical advantage to be derived from performing all input selection in a single stage. Not only does switching in a single stage require a less complicated switch, but in addition, interstage coupling is avoided. Since the extremely low signal voltage of the magnetic recording head requires high over-all voltage amplification, it is advantageous to perform this switching at the beginning of the amplifier.

Considering next the low frequency compensation circuit comprising resistor and capacitor B–3 and B–4, it should be pointed out that this feature of the invention makes possible reproduction of the extremely low audio frequencies which are ordinarily lost in magnetic recording systems because of the pronounced falling off in induced voltage in the magnetic head with decreasing frequency. Of course, the excellent low frequency response obtained according to the practice of the present invention is not solely dependent upon the compensation circuit under discussion, but is also dependent upon the fact that, for reasons which will appear more fully hereinbelow, the additional amplification necessary to raise signals of low audio frequency to the desired level is available. The low frequency compensation circuit, therefore, is dependent upon certain other features of the invention.

Several striking advantages accrue from the fact that I introduce the polarizing voltage into the audio frequency amplifier. Among these are the elimination of a separate power oscillator or a separate oscillator amplifier, one of which is otherwise required to develop the necessary polarizing current in the magnetic head. In addition, this arrangement provides for developing the polarizing current in a single winding in the head, which also carries the audio frequency currents.

Certain other features of the invention cooperate with this method of polarizing the record to produce still further advantages.

However, this technique presents certain novel problems which the circuit of the invention completely overcomes. For example, I have observed that when the polarizing voltage is injected into the audio frequency amplifier in the manner described, pronounced and disadvantageous variations in the polarizing current developed in the magnetic head occur upon adjustment of the volume control potentiometer B–8. Such adjustment apparently results in a corresponding variation in the plate impedance of V–5, which is effectively shunted across the output of the oscillator. Whatever the cause of the phenomenon, I have discovered that the insertion of resistor E–1 at the position indicated entirely eliminates this effect without appreciably attenuating the desired signal. While the resistance of E–1 is quite high, it should be borne in mind that the signal attenuation is in the ratio of the resistance of E–1 to the sum of the resistances of E–1 and the grid resistor of V–6. Since the grid resistor is of the order of megohms, it will be seen that the attenuation is quite low.

The injection of the polarizing current into the audio amplifier also complicates the use of the electron ray tube as an audio level indicator, for if the indicator is energized by a voltage taken from the amplifier at a point beyond the point at which the polarizing frequency is injected, the indicator will be blocked by the steady polarizing current. This difficulty is obviated by the filter network which I have introduced between the electron ray tube grid and the power amplifier anode to which it is connected.

In a magnetic recording and reproducing system which includes a radio frequency tuner, the presence of higher order harmonics in the leads to the loudspeaker voice coil may result in radiations which affect the operation of the tuner. I have found that the addition of capacitor I–1 across the secondary of the output transformer completely eliminates any difficulty from this source. The capacity of I–1 is sufficiently low as to have no effect upon either the audio frequencies or voltages of the polarizing frequency, which, therefore, do reach the voice coil. However, the fundamental frequency of the polarizing voltage is well above the audible frequency range, and, hence, cannot be sensed by a listener; and on the other hand, the fundamental frequency of the polarizing voltage is too low to introduce disturbances into the tuner.

Other striking advantages are derived from the series resistor-capacitor combinations by which the magnetic head is coupled to the output stage of the amplifier during recording.

First, this arrangement permits the high voltage of polarizing frequency developed by the output stage to be applied to the magnetic head without attenuation, while at the same time reducing the voltage of the audio frequency component. Since the reactance of the head is predominantly inductive, it will be understood that the voltage required to develop a given current in the head is a function of frequency, and as a result, a voltage high enough to develop an adequate current in the magnetic head at the audio frequencies is entirely insufficient to develop sufficient polarizing current. As a consequence, prior art devices have employed either separate sources of polarizing current or separate polarizing current windings on the magnetic head, or both. It will be seen, however, that the series network of the present invention permits the use of the same amplifier for both voltages, and yet provides the proper ratio of polarizing voltage to audio voltage.

The rising transmission characteristic of the filter also results in the application of higher voltages to the magnetic recording head in the upper audio frequency range than in the lower. Since the rate of falling off in impedance of the filter with frequency approximates the rate of increase of impedance of the head, the filter prevents a decrease in head current in the upper audio frequency range. It will be seen, therefore, that the filter both permits the development of adequate polarizing current in the head, and provides for constant current recording in the audio range.

A second principal advantage arising from this filter arrangement lies in the fact that the power amplifier tubes must have sufficient power capacity to provide adequate output on reproduction and to develop sufficient polarizing voltage during recording, which capacity is far in excess of that required to develop the audio frequency voltage necessary to develop sufficient recording current in the magnetic head. Without this filter, it is necessary to reduce the signal voltage applied to the power amplifier grids during recording, so that the output voltage of the power amplifier stage at the audio frequencies is relatively small compared to the power frequency hum and other extraneous signals. On the other hand, when the filter of the invention is employed to couple the magnetic head to the output stage, full-rated signal voltage may be applied to the power amplifier grids, with the result that the audio voltage appearing between the power amplifier anodes has a very satisfactory ratio to the hum and spurious signals appearing at the same point. This audio voltage, plus the relatively low but absolutely large hum and noise voltages, is then attenuated by the filter so that the audio frequency voltages applied to the recording head comprise a signal component whose ratio to the hum and noise component is as high as those obtained at the most favorable operating point of the tubes in question.

It should be pointed out that the nature of these filter networks permits their output terminals to be grounded during the reproduction operation, as is disclosed and claimed in U. S. Patent No. 2,539,121, entitled Output and Input Circuits for Magnetic Recording Systems, which patent is assigned to the assignee of the present invention. In the circuit of Figure 2, this is accomplished as was described above by the switch sections N–1 and N–2, which also serve to connect the output terminals of the filters to the magnetic head during recording.

It should be pointed out that my output coupling arrangement may be used with either triode or pentode power amplifier tubes, despite the great difference between the internal resistance of the two types. With triodes, whose internal resistance is so low as to be comparable to the impedance of the head, the variation in recording current without my coupling network would be tremendous. With pentodes, however, the internal resistance is so high that the recording current is more nearly constant, although considerable improvement in the current frequency relationship is also obtained with pentodes through the use of my filter. Of course, the other advantages, namely, improvement in signal-to-noise ratio and the simplicity of switching, to which reference has been made above, are attained to the same degree in either case.

The emphasis which has been placed in this application upon the use of a push-pull amplifier stage is due to the advantages to be derived from the high ratio of alternating output voltage to direct current supply voltage which may be obtained in this manner. In prior art devices employing push-pull output stages, the amplifier was coupled to the magnetic head through a transformer and thus no particular advantage was derived from this aspect of push-pull operation. According to the present invention, I am able to use a magnetic recording head having relatively high inductance and, hence, high impedance, by virtue of the fact that the polarizing current is developed by the relatively high voltage appearing between the output anodes. As a consequence of the large number of turns which I am thus able to employ, the output voltage of the magnetic head, when used in reproduction, is accordingly higher, and I am thus able to obtain better low frequency response, or, alternatively, to employ less amplification during reproduction, or to achieve both of these advantages to an intermediate degree. As an example of the head impedance which may be employed, I may state that the head used in the circuit of Figure 2 has an impedance of about 25,000 ohms at at 25 kc., although it should be strictly understood that the invention is not limited to use with heads of this order of impedance.

Certain advantages of the invention arise out of the cooperation between my novel polarizing system, the use of push-pull output tubes, my novel output filter networks, and the frequency compensation arrangements which I have described. For example, the frequency range which may be recorded and reproduced according to the invention is appreciably broader than has been known heretofore, due to the fact that the high polarizing voltage developed between the push-pull output anodes makes it possible to develop sufficient polarizing current, even in a relatively high impedance head, to fully record high level magnetic recording media. As a consequence, the output voltage of the magnetic head, when used in reproducing, is of sufficient amplitude at the lower audio frequencies to permit adequate reproduction of such frequencies, with a reasonable amount of voltage amplification.

In addition, these same factors permit the use of a head having sufficient turns to develop a high enough voltage during reproducing for coupling directly to the grid of an electron discharge tube, despite the fact that the impedance of such a head is too high to be adequately energized by conventional means. It is thus possible to eliminate the input and output transformers ordinarily used in magnetic recording equipment to overcome the inherent difficulty of employing the same head for both recording and reproducing. As is known, many turns make for high voltage output during reproducing, which is advantageous, but require high recording and polarizing voltages, which are difficult to attain. On the other hand, a head having few turns, while easily energized, produces insufficient voltage output during reproducing for direct coupling to a vacuum tube grid. The solution of the prior art, namely, the use of an input transformer or an output transformer, or both, not only introduces considerable expense, but also results in hum and other disadvantages, all of which are eliminated according to the practice of the present invention.

This application is a continuation of my copending application, Serial No. 787,644, filed November 24, 1947, now U. S. Patent No. 2,641,655.

I claim:

1. Magnetic recording and reproducing apparatus for use with a source of signals to be recorded, the apparatus comprising: a magnetic recording and reproducing head; an amplifier including a power amplifier stage; a generator of alternating polarizing voltage of frequency substantially higher than the highest signal component, the output of the generator being permanently connected with said amplifier for amplification of the polarizing voltage; and switch means for alternatively conditioning the apparatus for recording and reproducing including contacts connected with said units to operate them as follows: in recording, to connect the input of the amplifier to receive said signals and to connect the head to the output of the power amplifier stage and in reproducing, to connect the head to the input of the amplifier and to render said generator inoperative to deliver a polarizing voltage to the amplifier.

2. A construction in accordance with claim 1 in which the generator includes a vacuum tube having a plate and a cathode with a tank circuit connected there-between, the apparatus includes a source of plate supply voltage, and the generator is rendered inoperative to deliver a polarizing voltage to the amplifier by disconnecting said plate from said voltage source.

3. Magnetic recording and reproducing apparatus comprising in combination with a source of signals to be recorded: a magnetic recording and reproducing head; a source of alternating polarizing voltage of frequency substantially higher than the highest signal component; a power amplifier, the input of which is connectible with the signal source and with the magnetic head and is connected to the output of the polarizing source, the output of the power amplifier also being connectible with the head; and switch means for alternatively conditioning the apparatus for recording and reproducing including contact elements for connecting the head to the output of the power amplifier and for connecting the input of the power amplifier to receive signals from said signal source during recording, and in reproducing to connect the head to the input of the power amplifier and to render said polarizing source inoperative to deliver a polarizing voltage to the amplifier.

4. Magnetic recording and reproducing apparatus for use with a source of signals to be recorded, the apparatus comprising: a magnetic recording and reproducing head; a cascade amplifier having a plurality of stages including a power amplifier stage; a generator of alternating polarizing voltage of frequency substantially higher than the highest signal component, the output of the generator being connected to the input of the power amplifier stage; and switch means for alternatively conditioning the apparatus for recording and reproducing including contacts connected with said units to operate them as follows: in recording, to connect the input of the amplifier to receive said signals and to connect the head to the output of the power amplifier stage and in reproducing, to connect the head to the input of the amplifier and to render said generator inoperative.

5. Magnetic recording and reproducing apparatus for use with a source of a signal voltage to be recorded, the apparatus comprising: a magnetic recording and reproducing head; a generator of alternating polarizing voltage of frequency substantially higher than that of any signal component; an amplifier for amplifying a polarizing voltage supplied by the generator, the amplifier including an electron discharge tube having a control electrode to which a signal from said signal source may be applied to provide for amplification simultaneously with said polarizing voltage; and switch means for alternatively conditioning the apparatus for recording and reproducing including elements effective during recording to apply to said control electrode a signal from said signal source and to connect the head to the output of the amplifier, and, in reproducing, to apply to said control electrode a signal from the head and to render said generator inoperative to supply a polarizing voltage to said amplifier.

6. Apparatus in accordance with claim 5, in which said switch means includes elements effective during reproducing to disable said generator and thereby render it inoperative to supply a polarizing voltage to said amplifier.

7. Magnetic recording and reproducing apparatus for use with a source of signals to be recorded, and comprising a magnetic recording and reproducing head, an amplifier having an input circuit, a generator of alternating polarizing voltage of frequency higher than that of any signal component, and having an output circuit, a permanent connection between said circuits providing for feeding of output voltage from the generator output circuit to the amplifier input circuit, and switch means for alternatively conditioning the apparatus for recording and for reproducing and comprising elements effective during recording to apply a signal from the source to the amplifier input for amplification simultaneously with amplification of the polarizing voltage, and to apply the amplifier output to the head; and effective during reproducing to apply a signal from the head to the amplifier input circuit.

8. Apparatus in accordance with claim 7 in which said switch means includes further elements effective during reproducing for rendering said generator inoperative to deliver polarizing voltage to the amplifier.

9. Apparatus in accordance with claim 7 in which the impedance of the generator output circuit is at least as high as that of a 50 mmfd. condenser, and in which said permanent connection places said output circuit in shunt with the amplifier input circuit.

10. Apparatus in accordance with claim 7 in which said amplifier input circuit includes an electron discharge tube input electrode separated from ground by a high impedance.

References Cited in the file of this patent

UNITED STATES PATENTS

| | | |
|---|---|---|
| 2,351,005 | Camras | June 13, 1944 |
| 2,418,541 | Camras | Apr. 8, 1947 |
| 2,540,299 | Shoup | Feb. 6, 1951 |
| 2,641,655 | Bobb | June 4, 1953 |

FOREIGN PATENTS

| | | |
|---|---|---|
| 880,550 | France | Jan. 4, 1943 |